United States Patent [19]

Cupp et al.

[11] 3,737,895

[45] June 5, 1973

[54] BI-PHASE DATA RECORDER

[75] Inventors: Frederick B. Cupp, Fairport; Gary Van Camp, Palmyra, both of N.Y.

[73] Assignee: EDMAC Associates Inc., Rochester, N.Y.

[22] Filed: Aug. 2, 1971

[21] Appl. No.: 168,199

[52] U.S. Cl. ........340/347 DD, 178/68, 340/174.1 H, 329/104

[51] Int. Cl. ........G06f 3/00

[58] Field of Search ........340/347 DD, 174.1 H; 346/74 M; 178/66–68, 88; 325/38 A, 320; 329/104

[56] References Cited

UNITED STATES PATENTS

| | | | |
|---|---|---|---|
| 3,646,546 | 2/1972 | Norris | 178/68 X |
| 3,374,475 | 3/1968 | Gabor | 340/174.1 H |
| 3,543,172 | 11/1970 | Seppeler | 329/104 |
| 3,454,718 | 7/1969 | Perreault | 178/66 |
| 3,623,075 | 11/1971 | Bench | 340/347 DD |
| 3,341,779 | 9/1967 | Kedson | 329/104 X |

*Primary Examiner*—Charles D. Miller

*Attorney*—Raymond L. Owens

[57] ABSTRACT

Apparatus is disclosed for decoding a stream of Bi-Phase mark data which includes an oscillator, operating at a frequency at least three times greater then the Bi-Phase data rate, and a counter. Differentiated pulses derived from the Bi-Phase mark data stream are applied to two flip-flops. The first flip-flop provides a pulse which enables the counter coupling it to the oscillator and permits the counter in response to the oscillator output to count a predetermined sequence. During a portion of the predetermined sequence of the counter, it enables the second flip-flop which in response to the Bi-Phase mark data pulses produces a binary data stream. When the counter reaches a predetermined number, it enables a gate which decouples the counter from the oscillator and the second flip-flop is then prevented from changing state.

1 Claim, 2 Drawing Figures

FREDERICK B. CUPP
GARY A. VANCAMP

INVENTORS.

BY Raymond L. Owens
attny.

BI-PHASE DATA RECORDER

CROSS-REFERENCE TO RELATED APPLICATION

Reference is made to commonly assigned patent application entitled Recording System, Ser. No. 140,356, filed May 5, 1971, the disclosure of which is incorporated in its entirety herein.

BACKGROUND OF THE INVENTION

This invention relates generally to data decoding apparatus, and more particular concerns Bi-Phase mark decoders. Before discussing Bi-Phase mark decoders, the Bi-Phase mark encoding process will be briefly reviewed.

Bi-Phase mark encoders are well known to those skilled in the art and perform the function of translating a binary data stream comprised of normal digital data (see FIG. 1A ) to a Bi-Phase mark format which is composed of two frequencies. In effect the Bi-Phase mark data is a composite of two phase clock signal and is shown in FIG. 1B. One phase of clock pulses of the Bi-Phase mark format is termed boundary time since each of these pulses defines the edge or boundary of a bit cell or bit interval of the binary data stream. In producing the Bi-Phase mark format these pulses are in general, always applied to a divide by two flip-flop. The other phase of the clock is defined as mark time and due to the phase relationship of the clock pulses is in the center of the bit cell. Conventionally a second path exists for clock pulses to be applied to the divide by two flip-flop, typically via an OR gate. The boundary time pulses previously mentioned are applied to one input of the OR gate. MARK time pulses are combined with the binary data in an AND gate, and applied to the second input of the OR gate. Thus, if the binary data is a "one", two clock pulses will be applied to the flip-flop in one bit cell interval. If the data is a "zero", only one pulse will be applied to the flip-flop. Since the flip-flop divides the clock pulses by two, the output will be at the bit rate for a "one" data input and at one half bit rate for a "zero" data input. The resulting data stream is as previously noted shown in FIG. 1B.

Heretofore, one commonly used Bi-Phase mark decoder consisted of a latch or set-reset flip-flop and two resistance/capacitance pulse delay devices which timed out to one third and two thirds bit interval cell time (viz. the time between adjacent bits). One disadvantage with this arrangement is it is not easily adaptable to multispeed data rate operations. More specifically, if the bit rate is changed, it then becomes necessary to manually adjust two sets or more or RC time constants in indirect proportion to the bit rate change. In order to produce three speed changes, six RC time constants would require adjustment.

Accordingly, it is the primary object of this invention to provide a means of timing and decoding which is independent of fixed component parameters thus enabling operation at a multiplicity of data rates without manual or electrical switching or selection of special components. An additional object of the invention is to provide a means of controlling the timing process automatically in a manner to permit the reliable decoding of data despite variations in data rate.

SUMMARY OF THE INVENTION

In accordance with the invention there is provided a Bi-Phase mark decoding apparatus including the first and second flip-flops responsive to differentiated pulses from the Bi-Phase mark data stream. The apparatus further includes counter means and an oscillator. When the first flip-flop receives a pulse from the Bi-Phase mark data stream, it permits the counter to be coupled to the oscillator and produce a predetermined sequence based upon the frequency of the of the oscillator which permits the second flip-flop to change state in response to Bi-Phase mark pulses during a predetermined period of the counter thereby producing a binary output data stream. A third flip-flop stores the data for one bit period to provide a symetrical output stream. Advantageously, the apparatus may include a phase lock means which automatically adjusts the frequency of the oscillator as a function of the data rate.

A feature of this invention is that apparatus in accordance therewith is adjustable for any data rate without component change or switching.

Figures 1, 2:
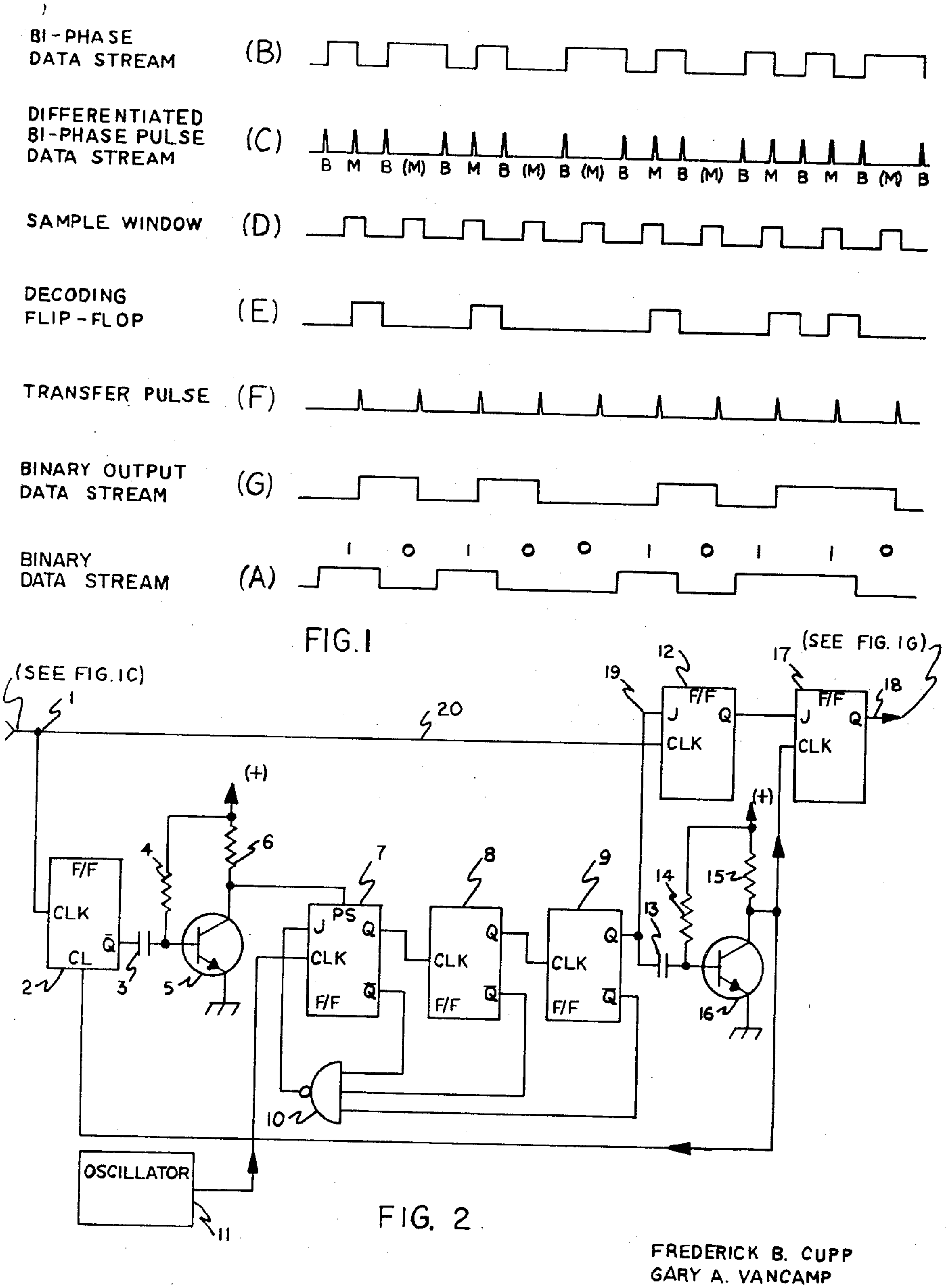
FIG. 1 is a waveform and timing pulse diagram showing the pertinent waveforms and time relationships in the embodiment of the invention to be described herein in conjunction with FIG. 2.
FIG. 2 is a diagram partially in block and schematic form, using standard logic notation, showing the essential parts of the system in the particular embodiment to be described.

While the invention will be described in connection with this preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Turning first to FIG. 1, there is shown the pertinent waveform and timing relationships involved in the conversion of Bi-Phase mark data into normal binary data. Line A shows a binary data stream for reference. Line B shows a Bi-Phase data stream which would result if the binary data in Line A were encoded in the manner previously described in the summary section. The conversion process begins by differentiating the changes of state in the data stream to create a train of narrow pulses of a uniform polarity. Notice a positive pulse is generated for each change of state in line B regardless of which direction the change of state takes. Beneath each of the pulses in line C a letter denotes whether the pulse represents a boundary time pulse or a mark time pulse. Notice that certain of the mark time pulses are indicated in parenthesis. This indicates the time a mark time pulse would normally be anticipated. However, examination of the binary data stream in line A indicates a zero has been transmitted at this point. Therefore, the mark pulse is missing. Thus, the occurrence or disappearance of the mark pulses at the anticipated time defines the changing of state in the original binary data stream from one to zero when a mark time pulse is missing and from zero to one when the pulse is present. A conventional Bi-Phase mark decoder begins by first determining which pulses are always present, thus defining the boundary pulses and then generating a sample window or a timing signal which indicates the anticipated arrival time of the mark pulses. This relationship is similar to that shown in line D of FIG. 1.

If a mark time pulse coincides with the sample window, as shown in line D, a decoding flip-flop will be triggered, thus generating a temporary one state as in line E. At the conclusion of the sample time, a transfer pulse is used to transfer the one state, if this has occurred, to an output register, which thus reconstructs the original binary data stream. This transfer pulse is shown in line F and the output register in line G.

In the invention to be described herein, the same methodology will be employed as to the decoding of the pulses in line C. However, the means of achieving this will not operate by conventional means since the conventional decoders will require time generation circuits which have limitations particularly with reference to multispeed operation or with variable data rates. In the preferred embodiment to be described, the generation of the sample window, line D of FIG. 1, is accomplished by means of a digital counter in which the counting rate or the interval between any particular counts is determined solely by the input clock rate without reliance upon charge storage timing circuits. As will be obvious to one skilled in the electronic arts, a number of counters of similar construction may be simultaneously controlled by a single oscillator. Thus making possible the control of a plurality of Bi-Phase mark decoders from a single master control element. In accordance with a further aspect of this invention, it will now be apparent to one skilled in the art, that said master control oscillator may include means to automatically control the frequency of the oscillator in such a manner as to cause it to follow a changing data rate providing of course, that said changes in data rate occur smoothly and without sudden jumps or step function changes. For the purpose of the system description herein, the variable oscillator may take the form of a phase locked oscillator having as one of its inputs a signal derived from the data stream itself by appropriate filtering means and having appropriate digital divider circuits in its output to yield the 12 times bit rate relationship. The embodiment of the phase locked oscillator is considered to be a standard practice and therefore, for the purpose of this invention will not be described in detail.

In the preferred construction of the invention as best depicted in FIG. 2, input pulses similar to those in line C of FIG. 1 are applied at the input 1 of a decoder 20. The input pulses are applied simultaneously to two flip-flops 2 and 12. Flip-flop 2 is wired in such a manner as to permit it to toggle or change state with each of the input pulses whereas flip-flop 12 will assume only whatever state has been applied to the data input line 19 at the time the pulse is applied to the clock input CL. Returning now to flip-flop 2, the input pulses will cause its output to alternately change state between the one or high state and the zero or low state. Each time the transition is made from the one to the zero state, a negative pulse will be coupled through coupling capacitor 3 and will be applied to the input or base of transistor 5. Additionally, capacitor 3 and resistor 4 comprise a timing network which will restore the base of transistor 5 to its conducting state after a brief period of time. The resulting interruption of collector current in transistor 5 will cause a change in the voltage drop across resistor 6 resulting in a positive pulse for a short interval or time. Flip-flops 7, 8 and 9 are connected in a manner well understood in the art so as to comprise a divide-by-eight count. Divide-by-eight counters are of course, commercially available. An inverting AND gate or NAND 10 is connected in such a manner as to recognize a zero state in the true outputs of the counter, resulting in a zero state at the output of gate 10. In other words, NAND gate 10 will produce a low level only when each of the flip-flops 7, 8 and 9 simultaneously are in the "O" state.

In such a condition, the resulting low or zero output state of gate 10 is applied to the J or control input of flip-flop 7. This low state applied to the control of flip-flop 7 prevents the flip-flop from toggling even though a clock pulse from the oscillator is applied to the CLK input. This in effect stalls the divide-by-eight counter. This is the normal or resting state of the counter. The appearance of a momentary positive pulse at the collector of transistor 5, when applied to the direct set input (labeled PS) of flip-flop 7 will shift it to the one state or first count. This will remove the low state at the output of NAND Gate 10 which in turn allows the divide-by-eight counter to begin normal operation. After the count of four has been reached, flip-flop 9 will toggle presenting a one state at its output. The output of flip-flop 9 is shown in its proper time relationship in line D of FIG. 1. This output is in effect the sample window and is applied to the data input 19 of decoding flip-flop 12. The time relationship of the sample window to bit timing may be seen from the fact that the oscillator providing clock pulses to the divide-by-eight counter is operating at 12 times the anticipated bit rate. The beginning of the sample window occurs at the fourth count or one-third of the bit interval. Since the oscillator frequency in this embodiment is at 12 times bit rate, four counts thus equals one-third of the total bit period. The output of flip-flop 9 remains in the one state until the count of eight is reached which corresponds to two-thirds of the period between bit cell boundarys. Thus, the sample window can be seen to exist in the one state from a point approximately one third bit interval after the boundary pulse until two thirds of the bit interval from the previous boundary pulse. If a mark pulse is applied to decoding flip-flop 12 during the time the sample window is in the one state, at the input 19, flip-flop 12 will toggle to the one state. At the termination of the count cycle flip-flops 7, 8 and 9 will have reached the all zero state which again enables gate 10 thus stalling the counter at the all zeros count until the next boundary time pulse again starts the counting cycle.

The termination of the count cycle also in addition to removing the sample window 19 from decoding flip-flop 12 will apply a negative pulse through coupling capacitor 13 to the base of transistor 16. Coupling capacitor 13 and resistor 14 comprise a second time delay network resulting in a positive pulse at the output or collector of transistor 16 due to the momentary interruption of current flow through resistor 15. This momentary pulse serves two purposes; one, it is utilized as a clock pulse to transfer the data appearing at the output decoding flip-flop 12 into output holding register flip-flop 17, and two, the momentary pulse is used to reset or clear the input flip-flop 2. This is done to assure that the state of flip-flop 2 will always be in the one condition at the $\overline{Q}$ output in readiness of the next boundary time pulse.

From the forging description, it may be seen that the operation of the decoder is asynchronous, that is, it does not rely upon previous data history. Each timing and decoding cycle is initiated by the boundary time pulse without any regard to the data which preceded it. Once initiated by a boundary time pulse, the timing relationships between the boundary time pulse and the sample window are purely a function of the oscillator and the number chosen in the counter to be used as the sample window. It may also be observed that other counting ratios may be easily applied to provide a variation in sample window width or to compensate for bias distortion which may occur in the incoming data stream. Variation in the oscillator frequency may also be utilized to shift the position of the sample window relative to the anticipated mark time position.

A still further advantage of the invention as described may be achieved if a phase locked oscillator is substituted for the fixed oscillator 11 shown in FIG. 2. A control signal may be derived from the Bi-Phase data stream line B of FIG. 1 and utilized as the reference for a phase locked oscillator, thus causing the oscillator frequency to vary in a fixed relationship to any aberrations or variations in the bit rate of the incoming data. Also in accordance with the use of a phase locked oscillator to provide variable timing pulses, the position of the mark time pulse in relation to the sample window input over line 19 may be applied as a reference to a phase locked oscillator and with suitable filtering may be used to automatically adjust the timing cycle of the sample window to accurately maintain its position relative to the mark time pulse to provide automatic compensation for bias or duty cycle distortion in data decoding systems.

Briefly the operation of the invention described herein may be summarized as a start/stop timing and decoding system which is initiated by a start pulse (viz. boundary time) which then derives its timing from a counter which is independent of the data rate. During a predetermined portion of this counter cycle, the incoming data will be examined to determine if a coincidence exists between the counter state and the incoming data. If a coincidence does exist, the coincidence will be indicated as a one state in the decoding flip-flop 12 which is then stored in holding register 17. The conclusion of the decoding process causes a pulse to be generated by transistor 16 which is used both as a clock pulse for loading the data in the output holding register and for resetting the input flip-flop 2 in readiness for the next boundary time pulse.

Although not immediately apparent, it may be easily understood that the position of the sample window during which data is decoded may be easily changed by alteration of the external control oscillator 11. If a commonalty in data rate exists between a number of channels of Bi-Phase mark encoded data, the decoding process for each of the channels may be simultaneously controlled by the same basic oscillator even though there may be no specific phase relationship between the data channels. This is due to the fact that the oscillator frequency chosen is significantly higher than the bit rate of any of the channels. Since many channels of Bi-Phase mark decoders may be controlled by a single master oscillator, it is immediately evident that changing the frequency of the master oscillator or a divider chain associated therewith, will result in simultaneous change of all of the data decoders to accept a new bit rate commensurate with the change of the oscillator frequency. The range of data rate which may be decoded in this manner will greatly exceed that range which can be accommodated by normal R-C timing circuits or one shot multivibrators used for timing generation. The maximum speed of operation is limited only by the ability of the digital logic elements used in the construction of the decoder. Thus it is apparent that there has been provided in accordance with the invention an example of a particular embodiment which fully satisfies the objects, aims and advantages set forth above.

While the invention has been described in conjunction with a specific embodiment thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

We claim:

1. In a decoding system adapted to receive a stream of Bi-Phase mark data formed of a plurality of bit cells defined by the adjacent boundary marks and containing a mark time pulse representative of digital information, means for decoding mark time pulses to produce a stream of binary data comprising:

a. an oscillator adapted to produce a signal at a frequency greater than the Bi-Phase means data rate;
b. a counter having three stages and effective in a first condition to be responsive to said oscillator for counting at said oscillator signal frequency and in a second condition to stop counting;
c. decoding means coupled to said counter and including a first flip-flop and a second flip-flop, said first flip-flop being effective in a first condition to be able to decode mark time pulses and in a second condition to be prevented from decoding such mark time pulses, and said second flip-flop being adapted to be coupled to said first flip-flop at a particular count of said counter to produce a binary output stream;
d. means coupled to said counter and responsive to a boundary mark after a selected time interval to cause said counter to switch from said second condition to said first counter condition;
e. said counter being effective to cause said first flip-flop to be in its first condition during only a predetermined portion of the period of the total count of said counter and effective in its second condition in other predetermined portions of the period of the total count of said counter means; and
f. a NAND gate coupled to said counter and responsive to when said counter has reached a predetermined count to cause said counter to switch to its first condition from its second condition.

* * * * *